(12) United States Patent
Feldermann et al.

(10) Patent No.: US 8,779,039 B2
(45) Date of Patent: Jul. 15, 2014

(54) FLAME RETARDANT POLYALKYLENE TERPHTHALATE/POLYCARBONATE COMPOSITIONS

(71) Applicant: Bayer Intellectual Property GMBH, Monheim (DE)

(72) Inventors: Achim Feldermann, Düsseldorf (DE); Berit Krauter, Opladen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/710,890

(22) Filed: Dec. 11, 2012

(65) Prior Publication Data

US 2013/0172467 A1 Jul. 4, 2013

(30) Foreign Application Priority Data

Dec. 13, 2011 (EP) .................................... 11193253

(51) Int. Cl.
*C08K 5/5313* (2006.01)
(52) U.S. Cl.
USPC .......................................... 524/126; 523/133
(58) Field of Classification Search
USPC .................................................. 524/126, 133
See application file for complete search history.

(56) References Cited

U.S. PATENT DOCUMENTS

| | | | | |
|---|---|---|---|---|
| 4,672,086 A * | 6/1987 | Seiler et al. | ................... | 524/127 |
| 2001/0007888 A1 * | 7/2001 | Asano | ........................... | 524/115 |
| 2007/0082995 A1 | 4/2007 | Costanzi et al. | | |
| 2008/0090950 A1 * | 4/2008 | Costanzi et al. | ............... | 524/414 |
| 2009/0215945 A1 | 8/2009 | Moulinie et al. | | |
| 2011/0251316 A1 | 10/2011 | Feldermann et al. | | |
| 2012/0053271 A1 * | 3/2012 | Feldermann et al. | ......... | 524/125 |
| 2012/0214913 A1 * | 8/2012 | Bell et al. | ...................... | 524/115 |

FOREIGN PATENT DOCUMENTS

| | | |
|---|---|---|
| DE | 19904814 A1 | 8/2000 |
| DE | 10 2007 061760 A1 | 6/2009 |
| DE | 10 2010 013991 A1 | 10/2011 |
| EP | 1680466 A1 | 7/2006 |
| EP | 2225320 A1 | 9/2010 |
| JP | 2001261973 A | 9/2001 |
| JP | 2001 335699 A | 12/2001 |

OTHER PUBLICATIONS

International Search Report of PCT/EP2012/074988 Dated January 14, 2013.

* cited by examiner

*Primary Examiner* — Peter Szekely
(74) *Attorney, Agent, or Firm* — Miles & Stockbridge P.C.

(57) ABSTRACT

The present invention relates to polyalkylene terephthalate/polycarbonate compositions, containing
  A) 49 to 70 parts by weight aromatic polycarbonate,
  B) 21 to 40 parts by weight polyalkylene terephthalate with more than 2 carbons in the diol component,
  C) 6 to 25 parts by weight of a salt of a phosphinic acid,
  D) 0 to 24 parts by weight conventional additives,
all parts by weight in the present application being standardized such that the sum of the parts by weight of components A+B+C+D in the composition adds up to 100,
and which are distinguished by an optimum combination of low molding shrinkage, high chemical resistance and good heat resistance together with good fire behavior, the use of the polycarbonate compositions for the production of moldings and the moldings themselves.

20 Claims, No Drawings

FLAME RETARDANT POLYALKYLENE TEREPHTHALATE/POLYCARBONATE COMPOSITIONS

CROSS REFERENCE TO RELATED APPLICATIONS

This application claims priority to EP 11193253.9 filed Dec. 13, 2011, the content of which is incorporated herein by reference in its entirety.

BACKGROUND

1. Field of the Invention

The present invention relates to polyalkylene terephthalate/polycarbonate compositions which contain a salt of a phosphinic acid, the use of the polyalkylene terephthalate/polycarbonate compositions for the production of mouldings and the mouldings themselves.

2. Description of Related Art

DE-A 19904814 describes thermoplastic moulding compositions containing 20-98 wt. % of a polyester, 1-50 wt. % of a polycarbonate, 1-40 wt. % of a phosphinic acid salt and/or of a diphosphinic acid salt and/or polymers thereof, and possible other additives.

EP 1 680 466 A1 describes the use of salts of hypophosphorous acid as flame retardants for polycarbonate compositions.

EP 2 225 320 A1 describes impact-modified polyalkylene terephthalate/polycarbonate compositions which contain a salt of phosphinic acid, wherein at a content of 20 parts by weight and more of component B, the flame retardancy no longer meets the necessary requirements.

JP-A 2001-261973 (Daicel Chemical Industries Ltd.) describes compositions of thermoplastic resins and inorganic and/or organic phosphinic acid salts. As an example, a combination of 51 wt. % PBT, 22 wt. % PC and 26 wt. % calcium phosphinate and 0.4 wt. % PTFE is mentioned.

The good effectiveness of organic, aromatic phosphates as flame retardants is countered by the disadvantage of the highly plasticising action of these compounds on the polymeric components, so that the heat resistance of these moulding compositions is unsatisfactory for many applications and other flame retardants are preferred.

Furthermore, it is known that polyesters often display inadequate flame retardancy and have a tendency towards very high moulding shrinkage, which makes it difficult to produce parts with tight tolerances.

SUMMARY

An object of the present invention was to provide polyalkylene terephthalate/polycarbonate compositions having an optimum combination of low moulding shrinkage, high chemical resistance and good heat resistance, together with good fire behaviour.

Surprisingly, it has now been found that moulding compositions or compositions according to the present application and as shown below and herein can display the desired property profile.

The compositions according to the invention comprise:
A) 49 to 70 parts by weight, preferably 51 to 70 parts by weight, more preferably 52 to 65 parts by weight, particularly preferably 53 to 61 parts by weight, aromatic polycarbonate,
B) 21 to 40 parts by weight, preferably 21 to 35 parts by weight, particularly preferably 25 to 33 parts by weight, polyalkylene terephthalate with more than 2 carbons in the diol component,
C) 6 to 25 parts by weight, preferably 7 to 22 parts by weight, more preferably 10 to 20 parts by weight, particularly preferably 13-20 parts by weight, of a salt of a phosphinic acid,
D) 0 to 50 parts by weight, preferably 0 to 24 parts by weight, more preferably 1.0 to 5.0 parts by weight, conventional additives, all parts by weight in the present application being standardised such that the sum of the parts by weight of components A+B+C+D in the composition adds up to 100.

DETAILED DESCRIPTION OF A PREFERRED EMBODIMENT

The quotient of component A) to B) is preferably in the range of 1.4 to 3.5, more preferably 1.5 to 3.0 and particularly preferably 1.6 to 2.7.

The compositions according to the invention preferably contain no rubber-based graft polymers (e.g. ABS/acrylonitrile-butadiene-styrene) and also no rubber-free vinyl (co) polymers (e.g. SAN/styrene-acrylonitrile).

In a preferred embodiment, the composition consists only of components A) to D).

Component A

Aromatic polycarbonates within the meaning of the present invention comprise aromatic polycarbonates and aromatic polyester carbonates.

Aromatic polycarbonates and/or aromatic polyester carbonates according to component A which are suitable according to the invention are known from the literature or can be produced by processes that are known from the literature (for the production of aromatic polycarbonates cf. e.g. Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates, e.g. DE-A 3 007 934).

The production of aromatic polycarbonates takes place e.g. by reacting diphenols with carbonic acid halides, preferably phosgene, and/or with aromatic dicarboxylic acid dihalides, preferably benzenedicarboxylic acid dihalides, by the interfacial polycondensation process, optionally using chain terminators, for example monophenols, and optionally using trifunctional or more than trifunctional branching agents, for example triphenols or tetraphenols. Production by a melt polymerisation process is also possible by reacting diphenols with, for example, diphenyl carbonate.

Diphenols for the production of aromatic polycarbonates and/or aromatic polyester carbonates are preferably those of formula (I)

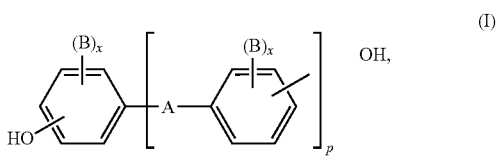

where
A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, C$_6$ to C$_{12}$ arylene, on to which other aromatic rings, optionally containing hetero atoms, can be condensed,
or a residue of formula (II) or (III)

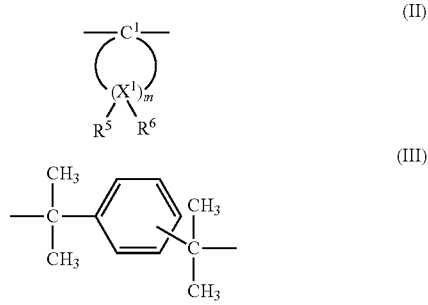

(II)

(III)

B is in each case C$_1$ to C$_{12}$ alkyl, preferably methyl, halogen, preferably chorine and/or bromine,
x each independently of one another is 0, 1 or 2,
p is 1 or 0, and
R$^5$ and R$^6$ can be selected for each X$^1$ individually and are, independently of one another, hydrogen or C$_1$ to C$_6$ alkyl, preferably hydrogen, methyl or ethyl,
X$^1$ is carbon and
m is an integer from 4 to 7, preferably 4 or 5, with the proviso that on at least one X$^1$ atom, R$^5$ and R$^6$ are simultaneously alkyl.

Preferred diphenols are hydroquinone, resorcinol, dihydroxydiphenols, bis(hydroxyphenyl) C$_1$-C$_5$-alkanes, bis(hydroxyphenyl) C$_5$-C$_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)-diisopropylbenzenes as well as the ring-brominated and/or ring-chlorinated derivatives thereof.

Particularly preferred diphenols are 4,4'-dihydroxydiphenyl, bisphenol A, 2,4-bis(4-hydroxy-phenyl)-2-methylbutane, 1,1-bis(4-hydroxyphenyl)cyclohexane, 1,1-bis(4-hydroxyphenyl)-3.3.5-trimethylcyclohexane, 4,4'-dihydroxy diphenyl sulfide, 4,4'-dihydroxy diphenyl sulfone and the di- and tetrabrominated or chlorinated derivatives thereof, such as for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particularly preferred is 2,2-bis(4-hydroxyphenyl)propane (bisphenol A).

The diphenols can be used individually or as any mixtures. The diphenols are known from the literature or are obtainable by processes that are known from the literature.

Suitable chain terminators for the production of the thermoplastic, aromatic polycarbonates are, for example, phenol, p-chlorophenol, p-tert.-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols with a total of 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)phenol and 4-(3,5-dimethylheptyl)phenol. The quantity of chain terminators to be used is generally between 0.5 mole % and 10 mole %, based on the molar sum of the diphenols used in each case.

The thermoplastic, aromatic polycarbonates have average weight average molecular weights (M$_w$, measured by GPC (gel permeation chromatography with polycarbonate standard) of 10,000 to 200,000 g/mol, preferably 15,000 to 80,000 g/mol, particularly preferably 24,000 to 36,000 g/mol.

The thermoplastic, aromatic polycarbonates can be branched in a known manner, preferably by incorporating 0.05 to 2.0 mole %, based on the sum of diphenols used, of trifunctional or more than trifunctional compounds, for example those with three and more phenolic groups. Preferably, linear polycarbonates, more preferably based on bisphenol A, are used.

Both homopolycarbonates and copolycarbonates are suitable. For the production of copolycarbonates according to the invention according to component A, 1 to 25 wt. %, preferably 2.5 to 25 wt. %, based on the total quantity of diphenols to be used, of polydiorganosiloxanes with hydroxyaryloxy end groups can also be used. These are known (U.S. Pat. No. 3,419,634) and can be produced by processes which are known in the literature. Also suitable are polydiorganosiloxane-containing copolycarbonates; the production of polydiorganosiloxane-containing copolycarbonates is described, for example, in DE-A 3 334 782.

Preferred polycarbonates, in addition to the bisphenol A homopolycarbonates, are the copolycarbonates of bisphenol A with up to 15 mole %, based on the molar sums of diphenols, of other diphenols mentioned as preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1.

In the production of polyester carbonates, a carbonic acid halide, preferably phosgene, is additionally used as a bifunctional acid derivative.

As chain terminators for the production of the aromatic polyester carbonates, apart from the already mentioned monophenols, their chlorocarbonic acid esters and the acid chlorides of aromatic monocarboxylic acids, which may optionally be substituted by C$_1$ to C$_{22}$ alkyl groups or by halogen atoms, as well as aliphatic C$_2$ to C$_{22}$ monocarboxylic acid chlorides, are also suitable.

The quantity of chain terminators is 0.1 to 10 mole % in each case, based in the case of phenolic chain terminators on moles of diphenol and in the case of monocarboxylic acid chloride chain terminators on moles of dicarboxylic acid dichloride.

In the production of aromatic polyester carbonates, one or more aromatic hydroxycarboxylic acids can additionally be used.

The aromatic polyester carbonates can be both linear and branched in a known manner (cf. DE-A 2 940 024 and DE-A 3 007 934), with linear polyester carbonates being preferred.

As branching agents, for example trifunctional or polyfunctional carboxylic acid chlorides can be used, such as trimesic acid trichloride, cyanuric acid trichloride, 3,3'-,4,4'-benzophenone tetracarboxylic acid tetrachloride, 1,4,5,8-naphthalene tetracarboxylic acid tetrachloride or pyromellitic acid tetrachloride, in quantities of 0.01 to 1.0 mole % (based on dicarboxylic acid dichlorides used) or trifunctional or polyfunctional phenols, such as phloroglucinol, 4,6-dimethyl-2,4,6-tri(4-hydroxyphenyl)hept-2-ene, 4,6-dimethyl-2,4-6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra-(4-hydroxyphenyl)

methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)-methane, 1,4-bis[4,4'-dihydroxytriphenyl)methyl]benzene, in quantities of 0.01 to 1.0 mole % based on diphenols used. Phenolic branching agents can be initially charged with the diphenols; acid chloride branching agents can be introduced together with the acid dichlorides.

In the thermoplastic, aromatic polyester carbonates, the proportion of carbonate structure units can vary arbitrarily. The proportion of carbonate groups is preferably up to 100 mole %, in particular up to 80 mole %, particularly preferably up to 50 mole %, based on the sum of ester groups and carbonate groups. Both the ester and the carbonate portion of the aromatic polyester carbonates can be present in the form of blocks or randomly distributed in the polycondensate.

The thermoplastic, aromatic polycarbonates and polyester carbonates can be used individually or in any mixture.

Component B

According to the invention, the compositions contain one or a mixture of two or more different polyalkylene terephthalates as component B).

Polyalkylene terephthalates within the meaning of the invention are polyalkylene terephthalates which are derived from terephthalic acid (or reactive derivatives thereof, e.g. dimethyl esters or anhydrides) and alkanediols, cycloaliphatic or araliphatic diols and mixtures thereof, for example based on propylene glycol, butanediol, pentanediol, hexanediol, 1,2-cyclohexanediol, 1,4-cyclohexanediol, 1,3-cyclohexanediol and cyclohexyldimethanol, the diol component according to the invention having more than 2 carbon atoms. Accordingly, preferably polybutylene terephthalate and/or polytrimethylene terephthalate are used as component B), most preferably polybutylene terephthalate.

The polyalkylene terephthalates according to the invention can also contain up to 5 wt. % isophthalic acid as monomer of the diacid.

Preferred polyalkylene terephthalates can be produced by known methods from terephthalic acid (or reactive derivatives thereof) and aliphatic or cycloaliphatic diols with 3 to 21 C atoms (Kunststoff-Handbuch, vol. VIII, pp. 695 ff., Karl-Hanser-Verlag, Munich 1973).

Preferred polyalkylene terephthalates contain at least 80, preferably at least 90 mole %, based on the diol component, of 1,3-propanediol and/or 1,4-butanediol residues.

The preferred polyalkylene terephthalates can contain, in addition to terephthalic acid residues, up to 20 mole % residues of other aromatic dicarboxylic acids with 8 to 14 C atoms or aliphatic dicarboxylic acids with 4 to 12 C atoms, such as residues of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid and cyclohexanedicarboxylic acid.

The preferred polyalkylene terephthalates can contain, in addition to 1,3-propanediol and/or 1,4-butanediol residues, up to 20 mole % of other aliphatic diols with 3 to 12 C atoms or cycloaliphatic diols with 6 to 21 C atoms, e.g. residues of 1,3-propanediol, 2-ethylpropane-1,3-diol, neopentyl glycol, 1,5-pentanediol, 1,6-hexanediol, 1,4-cyclohexanedimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, 2,5-hexanediol, 1,4-di-(β-hydroxyethoxy)benzene, 2,2-bis(4-hydroxy-cyclohexyl)propane, 2,4-dihydroxy-1,1,3,3-tetramethylcyclobutane, 2,2-bis (3-β-hydroxyethoxy-phenyl)propane and 2,2-bis(4-hydroxypropoxyphenyl)propane (DE-A 24 07 674, 24 07 776, 27 15 932).

The polyalkylene terephthalates can be branched by incorporating relatively small quantities of 3- or 4-hydric alcohols or 3- or 4-basic carboxylic acid, as described e.g. in DE-A 19 00 270 and U.S. Pat. No. 3,692,744. Examples of preferred branching agents are trimesic acid, trimellitic acid, trimethylolethane and -propane and pentaerythritol.

It is advisable to use no more than 1 mole % of the branching agent, based on the acid component.

Particularly preferred are polyalkylene terephthalates that have been produced solely from terephthalic acid or its reactive derivatives (e.g. its dialkyl esters, such as dimethyl terephthalate) and 1,3-propanediol and/or 1,4-butanediol (polypropylene and polybutylene terephthalate), and mixtures of these polyalkylene terephthalates.

Preferred polyalkylene terephthalates are also copolyesters which are produced from at least two of the above-mentioned acid components and/or from at least two of the above-mentioned alcohol components, and particularly preferred copolyesters are poly(1,3-propylene glycol/1,4-butanediol) terephthalates.

The polyalkylene terephthalates generally possess an intrinsic viscosity of approx. 0.4 to 1.5 dl/g, preferably 0.5 to 1.3 dl/g, measured in phenol/o-dichlorobenzene (1:1 parts by weight) at 25° C. in each case.

In an alternative embodiment, the polyesters produced according to the invention can also be used in a mixture with other polyesters and/or other polymers, mixtures of polyalkylene terephthalates with other polyesters preferably being used here.

Conventional additives, such as e.g. mould release agents, stabilisers and/or free-flow agents, can be mixed into the polyesters in the melt or applied on the surface.

Component C

The salt of a phosphinic acid (component C) within the meaning of the invention is to be understood as the salt of a phosphinic acid with any metal cation. Mixtures of salts can also be used, which differ in their metal cation. The metal cations are the cations of metals of main group 1 (alkali metals, preferably $Li^+$, $Na^+$, $K^+$), main group 2 (alkaline earth metals; preferably $Mg^{2+}$, $Ca^{2+}$, $Sr^{2+}$, $Ba^{2+}$, particularly preferably $Ca^{2+}$) or main group 3 (elements of the boron group; preferably $Al^{3+}$) and/or subgroups 2, 7 or 8 (preferably $Zn^{2+}$, $Mn^{2+}$, $Fe^{2+}$, $Fe^{3+}$) of the periodic table.

Preferably a salt or a mixture of salts of a phosphinic acid of formula (IV) is used,

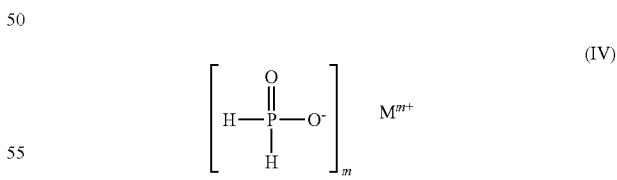

where $M^{m+}$ is a metal cation of main group 1 (alkali metals; m=1), main group 2 (alkaline earth metals; m=2) or main group 3 (m=3) or subgroups 2, 7 or 8 (wherein m signifies an integer from 1 to 6, preferably 1 to 3 and particularly preferably 2 or 3) of the periodic table.

Particularly preferred in formula (IV) are
for m=1 the metal cations $M^+=Li^+$, $Na^+$, $K^+$,
for m=2 the metal cations $M^{2+}=Mg^{2+}$, $Ca^{2+}$, $Sr^{2+}$, $Ba^{2+}$ and
for m=3 the metal cations $M^{3+}=Al^{3+}$,
and most preferred is $Ca^{2+}$ (m=2).

In a preferred embodiment, the average particle size d50 of the phosphinic acid salt (component C) is less than 80 µm, preferably less than 60 µm, and d50 is particularly preferably between 10 µm and 55 µm. The average particle size d50 is the diameter above and below which 50 wt. % of the particles lie. It is also possible to use mixtures of salts which differ in their average particle size d50.

These requirements of the particle size $d_{50}$ of the phosphinic acid salt are in each case associated with the technical effect that the flame retardant efficiency of the phosphinic acid salt is increased.

The phosphinic acid salt can be used either alone or in combination with other phosphorus-containing flame retardants. The compositions according to the invention are preferably free from phosphorus-containing flame retardants selected from the group of the monomeric and oligomeric phosphoric and phosphonic acid esters, phosphonate amines and phosphazenes. These other phosphorus-containing flame retardants, such as for example the monomeric and oligomeric phosphoric and phosphonic acid esters, have the disadvantage over the phosphinic acid salts that these reduce the heat resistance of the moulding compositions.

Component D

The composition can contain other commercial additives according to component D), such as flame retardant synergists, anti-dripping agents (for example compounds of the classes of substances of the fluorinated polyolefins, such as PTFE (polytetrafluoroethylene), the silicones and aramid fibres), lubricants and mould release agents (for example pentaerythritol tetrastearate), nucleating agents, stabilisers (for example phosphite-based stabilisers, sterically hindered phenols), antistatic agents (for example conductive carbon blacks, carbon fibres, carbon nanotubes and organic antistatic agents, such as polyalkylene ethers, alkyl sulfonates or polyamide-containing polymers), acids, fillers and reinforcing materials (for example glass or carbon fibres, mica, kaolin, talc, $CaCO_3$ and glass flakes) as well as dyes and pigments.

The fluorinated polyolefins can be used in one embodiment in the form of a coagulated mixture of emulsions of fluorinated polyolefins with emulsions of a vinyl (co)polymer, preferably with emulsions of a copolymer based on styrene-acrylonitrile.

In a preferred embodiment, only mould release agents, stabilisers and anti-dripping agents are added, particularly preferably pentaerythritol tetrastearate, Irganox B900, a further phosphite stabiliser and PTFE powder.

Production of the Moulding Compositions and Mouldings

The thermoplastic moulding compositions according to the invention are produced by mixing the respective components in a known manner and melt-compounding and melt-extruding them at temperatures of 260° C. to 300° C. in conventional equipment, such as internal mixers, extruders and twin screw extruders.

The mixing of the individual components can take place in a known manner both consecutively and simultaneously, and both at about 20° C. (room temperature) and at elevated temperature.

The invention also provides processes for the production of the moulding compositions and the use of the moulding compositions for the production of mouldings as well as the moulded parts themselves.

The moulding compositions according to the invention can be used for the production of mouldings of all kinds. These can be produced by injection moulding, extrusion and blow-moulding processes.

Another form of processing is the production of mouldings by thermoforming from previously produced sheets or films.

Examples of these mouldings are films, profiles, housing parts of all kinds, e.g. for domestic appliances, such as television sets, juice presses, coffee machines, mixers; for office equipment, such as monitors, flat screens, notebooks, printers, copiers; sheets, pipes, electrical installation ducts, windows, doors and other profiles for the construction sector (interior fittings and exterior applications) and electrical and electronic parts such as switches, plugs, sockets and installation housings, as well as body parts and interior parts for commercial vehicles, particularly for the automotive sector.

In particular, the moulding compositions according to the invention can also be used, for example, for the production of the following mouldings or moulded parts: interior fittings for rail vehicles, ships, aircraft, buses and other motor vehicles, housings for electrical equipment containing small transformers, housings for equipment for information processing and transfer, housings and claddings for medical equipment, massage equipment and housings therefor, toy vehicles for children, flat wall panels, housings for safety devices and for television sets, thermally insulated transport containers, mouldings for sanitaryware and bathroom fittings, covering grid plates for ventilation openings and housings for garden equipment.

The following examples serve to explain the invention further.

EXAMPLES

Component A

Linear polycarbonate based on bisphenol A with a relative solution viscosity of $\eta_{rel}=1.29\pm0.05$ measured in $CH_2Cl_2$ as solvent at 25° C. and a concentration of 0.5 g/100 ml.

Component B

Linear polybutylene terephthalate with a melt volume flow rate (MVR) according to ISO 1133 of 14 $cm^3$/10 min at 260° C. and 2.16 kg load Component C Calcium phosphinate, average particle size $d_{50}=50$ µm.

Component D

D-1: Irganox® B900 (mixture of 80 wt. % Irgafos® 168 (tris(2,4-di-tert.-butyl)phenyl phosphite) and 20 wt. % Irganox® 1076 (octadecyl-3-(3,5-di-tert-butyl-4-hydroxyphenyl) propionate) (BASF, Germany))

D-2: mixture of a phosphite stabiliser with linear polybutylene terephthalate

D-3: mould release agent pentaerythritol tetrastearate

D4: polytetrafluorethylene powder, e.g. CFP 6000 N, Du Pont.

Component E

Component E-1

ABS polymer, produced by emulsion polymerisation of 43 wt. % (based on the ABS polymer) of a mixture of 27 wt. % acrylonitrile and 73 wt. % styrene in the presence of 57 wt. % (based on the ABS polymer) of a particulate, crosslinked polybutadiene rubber (average particle diameter $d_{50}=0.35$ µm). The average particle size $d_{50}$ is the diameter above and below which 50 wt. % of the particles lie. It can be determined by means of ultracentrifuge measurement (W. Scholtan, H. Lange, Kolloid-Z. and Z. Polymere 250 (1972), 782-796).

Component E-2

Graft polymer of 15 wt. % of a shell of polymethyl methacrylate on 85 wt. % of a backbone of a silicone-acrylate composite rubber.

Production and Testing of the Moulding Compositions

Using a twin screw extruder (ZSK-25) (Werner & Pfleiderer), the feed materials listed in Table 1 are compounded and pelleted at a rate of 180 rpm and a throughput of 17.5 kg/h at a machine temperature of 260° C.

The finished pellets are processed on an injection moulding machine to form the appropriate test pieces (melt temperature 260° C., mould temperature 70° C., flow front velocity 240 mm/s)

Characterisation Takes Place as Follows:

The heat resistance was measured according to DIN ISO 306 (Vicat softening point, method B with 50 N load and a rate of heating of 120 K/h) on a single gated specimen with dimensions of 80×10×4 mm.

The fire behaviour is measured according to UL 94V on specimens with dimensions of 127×12.7×0.8 mm.

The moulding shrinkage is determined on the basis of ISO 2577 on sheets with dimensions of 150×105×3 mm.

Chemical resistance (ESC behaviour) gives the time to fracture with 2.4% outer fibre strain after storage of the test piece in dioctyl phthalate (DOP) at room temperature on a single gated specimen with dimensions of 80×10×4 mm.

The particle size ($d_{50}$) is determined by SediGraph in accordance with ISO 13317-3.

The invention claimed is:
1. A composition comprising
   A) 49 to 70 parts by weight aromatic polycarbonate,
   B) 21 to 40 parts by weight polyalkylene terephthalate with more than 2 carbons in a diol component thereof,
   C) 6 to 25 parts by weight of a salt of a phosphinic acid,
   D) 0 to 50 parts by weight one or more additives,
   all parts by weight being standardised such that a sum of the parts by weight of components A+B+C+D in the composition adds up to 100,
   wherein the composition is free from rubber-based graft polymers.
2. The composition according to claim 1, wherein a ratio of component A) to B) is in a range of from 1.4 to 3.5.
3. The composition according to claim 1, wherein a ratio of component A) to B) is in a range of from 1.6 to 2.7.
4. The composition according to claim 1, comprising 53 to 61 parts by weight aromatic polycarbonate component A).
5. The composition according to claim 1, comprising 25 to 33 parts by weight polyalkylene terephthalate with more than 2 carbons in the diol component according to component B).
6. The composition according to claim 1, comprising 7 to 22 parts by weight of a salt of a phosphinic acid according to component C).
7. The composition according to claim 1, comprising 10 to 20 parts by weight of a salt of a phosphinic acid according to component C).
8. The composition according to claim 1, comprising 0 to 24 parts by weight additives according to component D).
9. The composition according to claim 1, wherein component B is polybutylene terephthalate.
10. The composition according to claim 1, comprising as component C) a salt and/or a mixture of salts of a phosphinic acid of formula (IV)

TABLE 1

Compositions and their properties

|  | Ex. 1 | Comp. 1 | Comp. 2 | Comp. 3 | Ex. 2 | Comp. 4 | Ex. 3 | Ex. 4 | Comp. 5 | Comp. 6 |
|---|---|---|---|---|---|---|---|---|---|---|
| A | 53 | 45 | 42 | 67 | 61 | 59 | 49 | 56 | 47 | 47 |
| B | 31 | 39 | 42 | 17 | 23 | 34 | 29 | 32 | 27 | 27 |
| C | 14 | 14 | 14 | 14 | 14 | 5 | 20 | 10 | 14 | 14 |
| D-1 | 0.2 | 0.2 | 0.2 | 0.2 | 0.2 | 0.2 | 0.2 | 0.2 | 0.2 | 0.2 |
| D-2 | 0.8 | 0.8 | 0.8 | 0.8 | 0.8 | 0.8 | 0.8 | 0.8 | 0.8 | 0.8 |
| D-3 | 0.6 | 0.6 | 0.6 | 0.6 | 0.6 | 0.6 | 0.6 | 0.6 | 0.6 | 0.6 |
| D-4 | 0.4 | 0.4 | 0.4 | 0.4 | 0.4 | 0.4 | 0.4 | 0.4 | 0.4 | 0.4 |
| E-1 |  |  |  |  |  |  |  |  | 10 |  |
| E-2 |  |  |  |  |  |  |  |  |  | 10 |
| Ratio A:B | 1.71 | 1.15 | 1.00 | 3.94 | 2.65 | 1.73 | 1.69 | 1.75 | 1.74 | 1.74 |
| ESC DOP time to fracture (2.4%) [hhh:mm] | 168 | 168 | 168 | 000:14 | 168 | 168 | 168 | 168 | 168 | 168 |
| Moulding shrinkage transverse [%] | 0.58 | 0.73 | 0.79 | 0.44 | 0.51 | 0.69 | 0.53 | 0.64 | 0.61 | 0.68 |
| Vicat [° C.] | 131 | 135 | 136 | 120 | 124 | 128 | 130 | 129 | 123 | 126 |
| Total after-flame time UL 94V (0.8 mm) Σ 2 and 7 days storage [s] | 59 | 72 | 130 | 29 | 30 | 325 | 34 | 107 | 369 | 97 |
| UL 94V (0.8 mm) [class] | V0 | V0 | V1 | V0 | V0 | failed | V0 | V1 | failed | V1 |

It can be seen from Table 1 that only the compositions according to the invention in examples 1, 2, 3 and 4 with a combination of polycarbonate, polyester and calcium phosphinate in the quantities according to the invention achieve the object, i.e. a combination of low moulding shrinkage, high chemical resistance and good heat resistance together with good fire behaviour. In one advantageous embodiment the composition comprises a combination of chemical resistance expressed as ESC behaviour that is greater than 100 hours and a moulding shrinkage that is less than 0.6%.

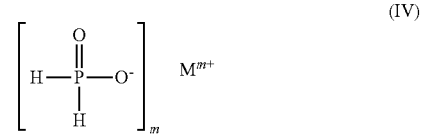

where
$M^{m+}$ is a metal cation of main group 1 (alkali metals; m=1), main group 2 (alkaline earth metals; m=2) or main group 3 (m=3) or subgroups 2, 7 or 8 (wherein m signifies an integer from 1 to 6) of the periodic table.

11. The composition according to claim 10, wherein the metal cation is $Li^+$, $Na^+$, $K^+$, $Mg^{2+}$, $Ca^{2+}$, $Sr^{2+}$, $Ba^{2+}$, $Al^{3+}$, $Zn^{2+}$, $Mn^{2+}$, $Fe^{2+}$ and/or $Fe^{3+}$.

12. The composition according to claim 11, wherein $M^{m+}=Ca^{2+}$ and m=2.

13. The composition according to claim 1, wherein an average particle size $d_{50}$ of the phosphinic acid salt (component C) is not more than 80 μm.

14. The composition according to claim 1, wherein the composition is free from rubber-free vinyl (co)polymers.

15. A moulding that has been produced from a composition of claim 1.

16. A method for making a moulding comprising forming a composition according to claim 1 into said moulding.

17. A composition according to claim 1, comprising a combination of chemical resistance expressed as ESC behaviour that is greater than 100 hours and a moulding shrinkage that is less than 0.6%.

18. The composition according to claim 1, wherein the composition is free from phosphorus-containing flame retardants selected from the group consisting of monomeric and oligomeric phosphoric and phosphonic acid esters, phosphonate amines, and phosphazenes.

19. The composition of claim 1, wherein component D) comprises flame retardant synergist, anti-dripping agent, lubricant and mould release agent, nucleating agent, stabiliser, antistatic agent, acid, filler and reinforcing material, dye, or pigment.

20. A composition consisting of
A) 49 to 70 parts by weight aromatic polycarbonate,
B) 21 to 40 parts by weight polyalkylene terephthalate with more than 2 carbons in a diol component thereof,
C) 6 to 25 parts by weight of a salt of a phosphinic acid,
D) 0 to 50 parts by weight one or more additives,
all parts by weight being standardised such that a sum of the parts by weight of components A+B+C+D in the composition adds up to 100,
wherein the composition is free from rubber-based graft polymers.

* * * * *